UNITED STATES PATENT OFFICE 2,365,853

BREAKING OF CRUDE OIL EMULSIONS

Meyer S. Agruss, Chicago, and Hans Schindler, Evanston, Ill., assignors to The Pure Oil Company, Chicago, Ill., a corporation of Ohio No Drawing. Application April 22, 1942, Serial No. 440,092

17 Claims. (Cl. 252—333)

This invention relates to a process and reagent for demulsifying oils.

Petroleum oils as they are produced from oil wells frequently are emulsified with water which sometimes contains considerable quantities of salts, which water or brine is in the dispersed phase. It is necessary to separate the major portion of the aqueous phase from the oil prior to pumping the oil through pipelines and prior to refining the oil in order to prevent excessive corrosion of equipment.

The object of this invention is to provide a method and reagent for breaking water-in-oil emulsions so that the major portion of the water or brine contained in the emulsion may be separated from the oil.

It has previously been discovered that sulfonated tall oil or alkali salts thereof are excellent demulsifying agents for water-in-oil emulsions. Tall oil is a dark odorous material recovered from waste cooking liquor in the manufacture of kraft paper pulp. It is common practice to purify the tall oil by distillation or by solvent and/or sulfuric acid refining and to sulfonate the refined product. The sulfonation may be effected at a temperature of 32°–68° F. with from 50–100% by weight of concentrated sulfuric acid. The acid is added slowly to the oil while the latter is stirred. Excess acid is washed out with sodium chloride solution and the resulting product neutralized with sodium hydroxide solution thereby forming the sodium salt. A purified form of the sodium salt of tall oil is now available commercially under the name "Indusoil," and the sodium salt of sulfonated tall oil is also available on the market under the brand names "Sulfonated Indusoil C-50" and "Sulfonated Indusoil 63."

Although the alkali salts, such as sodium, potassium or ammonium of sulfonated tall oil, alone are efficient demulsifying agents, it has now been found that the efficiency of these materials can be greatly increased by using them in combination with an alkali salt such as the sodium, potassium or ammonium salt of oil soluble sulfonic acids such as those derived from petroleum oils by treatment with sulfuric acid. Such oil soluble sulfonic acids are well known in the art of refining petroleum oils and are frequently called mahogany acids or mahogany sulfonic acids. The ratio of alkali salt of sulfonated tall oil to alkali salt of mahogany acids which may be effectively employed may range from approximately 1 part by weight of the former to 4 parts by weight of the latter to 4 parts by weight of the former to 1 part by weight of the latter.

A further improvement in the efficiency of such demulsifying agent mixtures may be effected by employing therewith a small proportion of a surface-active material such as low molecular weight alcohols, poly hydroxy aliphatic alcohols and their halogen substituted products and amines. Examples of suitable materials are ethyl alcohol, ethylene glycol, diethylene glycol, glycerine dichlorhydrin, n-butyl amine, n-propyl amine, ethyl aniline, pyridine and quinoline. It will be understood that these materials may be used in the demulsifying compositions singly or in combination.

In order to demonstrate the efficacy of demulsifying agents in accordance with this invention, a series of tests were run on crude oil emulsions containing water in a dispersed phase using the following demulsifying agents:

| Composition | Identified as— |
|---|---|
| Sulfonated Indusoil oil C-50 | A |
| Unrefined Gammanol | B |
| 50% by weight Sulfonated Indusoil oil C-50<br>50% by weight Unrefined Gammanol | C |
| Commercial demulsifier | D |

Demulsifying agents A, B and C were compared with a well-known branded commercial demulsifying agent which has been referred to as "D," and the following results obtained:

Table I

| Source of crude oil | Formation from which crude oil obtained | Demulsifying agent | Water separated | Treating temp., ° F. |
|---|---|---|---|---|
|  |  |  | Cc. |  |
| Oklahoma | Siliceous | A | 52 | 120–130 |
| Do | do | B | 160 | 120–130 |
| Do | do | C | 190 | 120–130 |
| Do | do | D | 182 | 120–130 |

In each of the tests listed in Table I, 500 cc. of crude oil emulsion from Little 204 lease, Cumberland District, Oklahoma, were treated with 0.6 cc. of demulsifying agent. The treated samples of emulsion were allowed to stand 30 minutes before the separated water was measured. It will be seen from the data in Table I that both the sodium salt of tall oil in the form of Sulfonated Indusoil Oil C-50 and Unrefined Gammanol, which is a commercial grade of the sodium salt of oil soluble sulfonic acid, are good demulsifying agents. However, when a mixture containing 50% by weight of each of the demulsifying agents was employed, the results were unusually good and were far better than could possibly have been expected on a basis of the results obtained when the individual constituents were used alone. The mixture of demulsifying agents produced results superior to those obtained with the commercial demulsifying agent.

Another series of tests were run on separate samples of crude oil emulsions in order to demonstrate the comparative efficacy of the preferred mixture of demulsifying agents with the aforementioned commercial demulsifying agent. These results are shown in Table II.

Table II

| Source of crude oil | Demulsifier | Ratio of chemical to emulsion | Per cent of total water separated | Per cent B. S. & W. in oil after treating |
|---|---|---|---|---|
| Oklahoma | C | 1:500 | 99.95 | 0.05 |
| Do | C | 1:500 | 99.95 | 0.05 |
| Do | D | 1:500 | 97.7 | 1.0 |
| Do | D | 1:500 | 67.3 | 15.0 |
| Do | C | 1:500 | 99.0 |  |
| Do | D | 1:500 | 83.0 |  |
| Illinois | C | 1:1000 | 99.6 | 0.2 |
| Do | D | 1:1000 | 99.7 | 0.3 |

The tests in Table II were all conducted at temperatures of 120–130° F. The data clearly show that demulsifier C containing the preferred mixture of demulsifying agents is superior to the commercial demulsifying agent. These results were obtained in the laboratory on crude oil emulsion shipped in drums from the producing fields. Some water had separated from these oils during shipment, and this water was decanted from the emulsion prior to making the tests. Pipeline specifications ordinarily require that crude oil shall contain not more than 0.25% of B. S. & W. It will be noted that oils treated with the preferred combination of demulsifying agents contain materially less B. S. & W. than that required by the pipeline specifications.

No additional surface-active agents were incorporated in any of the demulsifiers employed in the foregoing tests since the commercial demulsifier presumably already contains such an agent and since the Unrefined Gammanol and Sulfonated Indusoil Oil C-50 contained ethyl alcohol (a surface-active agent) in the form in which these materials were obtained from the suppliers. The composition of Sulfonated Indusoil Oil C-50 as obtained from the suppliers is approximately as follows: 50 to 55% by weight sodium salt of sulfonated tall oil, 23 to 20% water, 22 to 20% alcohol, 5% pine oil. The Unrefined Gammanol as received from the suppliers contained about 5% by weight water and alcohol, the remainder being the sodium salt of mahogany acids. Inasmuch as both the Sulfonated Indusoil Oil C-50 and the Unrefined Gammanol contained alcohol and since this material functions as a surface-active agent in demulsifying compositions within the scope of this invention, the addition of further amounts of a compound was unnecessary in order to obtain a substantial reduction in interfacial tension and highly efficacious demulsifying compositions. The presence of water and alcohol in the Sulfonated Indusoil Oil C-50 and the Unrefined Gammanol materially reduces the viscosity of these substances and thereby provides for greater ease in handling and greater efficiency in applying the demulsifying compositions to crude oil emulsions.

The amounts of surface-active agents which are ordinarily used with the mixtures of alkali salt of sulfonated tall oil and alkali salt of oil soluble sulfonic acid are of the order of 5 to 40% by weight of the demulsifying composition. It should not be necessary for the amount of surface-active agent plus water to be substantially in excess of 40% by weight of the total demulsifying composition and ordinarily this figure will not exceed 30% by weight. The ratio of demulsifying agent to oil treated may be varied over a wide range. It has been found that generally from 0.1 gallon to 1 gallon of demulsifying agent to 100 bbl. of the emulsified oil is sufficient to obtain the desired B. S. & W. value.

Treatment of the emulsions with the demulsifying agents may be effected at atmospheric temperatures, but in order to expedite the separation of water and oil phases, it is preferable to heat the emulsion to a temperature between about 80 and 150° F. for the treating operation. The water and oil phases are ordinarily separated by settling and decantation. The time of settling required to effect a satisfactory separation of water will vary considerably depending upon such factors as the temperature at which the treating operation is effected, quantity of demulsifying agent used and the desired water content of the treated settled oil.

We claim:

1. A reagent for use in breaking water-in-oil emulsions comprising substantial amounts of alkali salt of sulfonated tall oil and alkali salt of mahogany sulfonic acid in the ratio of approximately 1 to 4 parts of the former to 4 to 1 parts of the latter.

2. A reagent in accordance with claim 1 in which the tall oil has been purified by solvent extraction prior to sulfonation.

3. A reagent in accordance with claim 1 in which the tall oil has been purified by distillation prior to sulfonation.

4. A reagent in accordance with claim 1 in which the tall oil has been purified by sulfuric acid treatment prior to sulfonation.

5. A reagent in accordance with claim 1 and containing about 5 to 40% by weight of a compound selected from the group consisting of ethyl alcohol, ethylene glycol, diethylene glycol and glycerine dichlorhydrin.

6. A reagent for use in breaking water-in-oil emulsions comprising substantial amounts of alkali salt of sulfonated tall oil and alkali salt of mahogany sulfonic acid in the ratio of approximately 1 to 4 parts of the former to 4 to 1 parts of the latter and a minor amount of a compound selected from the group consisting of ethyl alcohol, ethylene glycol, diethylene glycol and glycerine dichlorhydrin.

7. A reagent for use in breaking water-in-oil emulsions comprising substantial amounts of alkali salts of sulfonated tall oil and alkali salt of mahogany sulfonic acid in the ratio of approximately 1 to 4 of the former to 4 to 1 of the latter and a minor amount of a low molecular weight alcohol.

8. A reagent in accordance with claim 6 in which the compound is ethyl alcohol.

9. A reagent in accordance with claim 6 and containing a minor amount of water.

10. A reagent for use in breaking water-in-oil emulsions comprising alkali salt of sulfonated tall oil and alkali salt of mahogany sulfonic acid, ethyl alcohol and water, the total amount of the latter two materials being not substantially in excess of 40% by weight of the entire reagent and the ratio of alkali salt of sulfonated tall oil to alkali salt of mahogany sulfonic acid being between approximately 1 to 4 and 4 to 1.

11. A reagent for use in breaking water-in-oil emulsions comprising the following materials in approximately the indicated amounts by weight:

| | Per cent |
|---|---|
| Sodium salt of sulfonated tall oil | 27 |
| Sodium salt of mahogany sulfonic acid | 43 |
| Alcohol | 15 |
| Water | 15 |

12. The method of breaking water-in-oil emulsions which comprises mixing the emulsions with reagent of claim 1 and separating resultant oil and water layers.

13. The method of breaking a water-in-oil emulsion which comprises mixing the emulsion with the reagent defined in claim 1, at a temperature of approximately 80–150° F.

14. The method of breaking water-in-oil emulsions which comprises mixing the emulsions with reagent of claim 6 and separating resultant oil and water layers.

15. The method of breaking water-in-oil emulsions which comprises mixing the emulsions with reagent of claim 10 and separating resultant oil and water layers.

16. The method of breaking water-in-oil emulsions which comprises mixing the emulsions with reagent of claim 11 and separating resultant oil and water layers.

17. The method of breaking a water-in-oil emulsion which comprises mixing with the emulsion the reagent defined in claim 11, at a temperature of approximately 80 to 150° F.

MEYER S. AGRUSS.
HANS SCHINDLER.